(12) United States Patent
Cathey, Jr. et al.

(10) Patent No.: US 7,031,054 B2
(45) Date of Patent: Apr. 18, 2006

(54) METHODS AND SYSTEMS FOR REDUCING DEPTH OF FIELD OF HYBRID IMAGING SYSTEMS

(75) Inventors: Wade Thomas Cathey, Jr., Boulder, CO (US); Edward Raymond Dowski, Jr., Lafayette, CO (US); Sherif S. Sherif, London (GB)

(73) Assignee: The Regent of the University of Colorado, Boulder, CO (US)

( * ) Notice: Subject to any disclaimer, the term of this patent is extended or adjusted under 35 U.S.C. 154(b) by 0 days.

(21) Appl. No.: 10/682,014

(22) Filed: Oct. 9, 2003

(65) Prior Publication Data

US 2005/0088745 A1    Apr. 28, 2005

Related U.S. Application Data

(60) Provisional application No. 60/417,332, filed on Oct. 9, 2002.

(51) Int. Cl.
*G02B 21/36* (2006.01)
*G02B 23/00* (2006.01)

(52) U.S. Cl. ........................... 359/363; 359/368
(58) Field of Classification Search ............ 356/363, 356/368, 15, 566
See application file for complete search history.

(56) References Cited

U.S. PATENT DOCUMENTS

| | | | |
|---|---|---|---|
| 5,748,371 A * | 5/1998 | Cathey et al. ............... | 359/558 |
| 6,097,856 A * | 8/2000 | Hammond, Jr. ............. | 382/312 |
| 2002/0118457 A1 | 8/2002 | Dowski, Jr. | |
| 2002/0134921 A1 | 9/2002 | Cathey, Jr. | |
| 2003/0127584 A1 | 7/2003 | Dowski, Jr. et al. | |

FOREIGN PATENT DOCUMENTS

| | | |
|---|---|---|
| WO | WO 99/35529 | 7/1999 |
| WO | WO 99/57599 | 11/1999 |
| WO | WO 01/99431 A3 | 12/2001 |
| WO | WO 02/052331 A3 | 7/2002 |
| WO | WO 02/057832 A3 | 7/2002 |
| WO | WO 02/099502 | 12/2002 |
| WO | WO 02/099511 | 12/2002 |
| WO | WO 03/009041 A3 | 1/2003 |
| WO | WO 03/021333 A1 | 3/2003 |

\* cited by examiner

*Primary Examiner*—Mark A. Robinson
*Assistant Examiner*—Alessandro Amari
(74) *Attorney, Agent, or Firm*—Lathrop & Gage LC

(57) ABSTRACT

An imaging system for imaging an object onto an image plane. An optical arrangement forms an intermediate image of the object at an intermediate plane with a first value of axial resolution. The imaging system also includes a digital processor configured to process the intermediate image to form a final image of the object. The imaging system further includes a specially designed optical element that cooperates with the optical arrangement and the digital processor to define a second value of axial resolution that is greater than the first value.

37 Claims, 17 Drawing Sheets

METHODS AND SYSTEMS FOR REDUCING DEPTH OF FIELD OF HYBRID IMAGING SYSTEMS

RELATED APPLICATIONS

This application claims priority to U.S. provisional application Ser. No. 60/417,332, filed 9 Oct. 2002 and hereby incorporated by reference.

STATEMENT REGARDING FEDERALLY SPONSORED RESEARCH

The United States Government has certain rights in this invention pursuant to contract number DAAD 19-00-1-0514 awarded by the U.S. Army Research Laboratory in conjunction with the U.S. Army Research Office.

FIELD OF THE INVENTION

The invention relates generally to imaging systems and, more particularly, to hybrid imaging systems with reduced depth of field.

BACKGROUND

In prior art imaging systems, the image of an object gradually goes out of focus as the object moves from the plane of best focus. The image of a portion of the object that is in focus is also degraded by the image of adjacent portions of the object that are out of focus. This effect causes certain problems when detailed information is desired from the in-focus portion of the object and without influence from the surrounding portions of the object. It is particularly important in the field of microscopy to avoid degradation of the in-focus image due to adjacent out of focus images.

Previous methods of obtaining a clear image of the desired portion or plane of an object include the use of pupil-plane filters. Pupil-plane filters utilize either amplitude (absorption) modulation or phase modulation of the light distribution in the pupil plane. Continuously varying amplitude pupil plates and annular binary pupil plates have been used to reduce the width of the central lobe of the axial intensity point spread function (PSF). These amplitude plate-based methods share two serious drawbacks: decreased optical power at the image plane and possible decrease in the lateral image resolution. A phase-only pupil filter has also been used to reduce the axial spot size of a confocal scanning microscope. However, such a filter is not applicable to a hybrid imaging system because it employs a phase filter to reduce the width of the axial main lobe. However, due to the extremely high side-lobes in the PSF of such a phase filter, the useful optical power is reduced significantly.

Structured illumination is another prior art approach to reducing the depth of field of an imaging system. For example, M. Neil et al., Method of obtaining optical sectioning by using structured light in a conventional microscope, Optics Letters, vol. 22, no. 24, pp. 1905–1907 (1997), demonstrated that sinusoidal fringes of light would be formed by interference and projected onto the object. When an image is formed, the fringes go out of focus faster than a normal image. This effect leads to a slightly smaller depth of field; but the portions of the image that lie in the nulls of the sinusoidal fringes are lost. By the use of multiple exposures where the sinusoidal fringe is moved by a fraction of the fringe period for additional images, the complete image of the object can be retrieved when all of the images are superimposed on one another. One disadvantage of structured illumination is that precise alignment is needed. Another disadvantage is that multiple exposures must be made of the object to obtain a single image. This necessity for multiple exposures is problematic, especially when the object is moving, as in the case of live objects or moving parts along an assembly line. In the case of fluorescence microscopy, since the fluorophore is being bleached by the ultraviolet light used to excite the fluorophore, the later images are dimmer. If the object is a live cell, the ultraviolet light also damages the cell, making additional exposures particularly harmful.

In confocal microscopy, optical "slices" are produced by focusing a point source onto the specimen and by imaging that point onto a point detector. Out-of-focus light is preferably removed to produce an in-focus image. Unfortunately, in order to obtain a complete image of the specimen, each plane of the specimen must be scanned point by point and the images of each plane then combined to achieve a three-dimensional result. Therefore, confocal microscopy is time consuming and is not suitable for imaging rapidly changing objects—such as living or moving samples.

In contrast, the deconvolution microscope works with images of slices taken by a standard imaging system. Once images of the slices are taken and stored, along with the in-focus and out-of-focus PSFs of the imaging system, the deconvolution microscope attempts to calculate the image in each plane. However, the digital post-processing used in calculating the image generates many undesirable artifacts.

SUMMARY OF THE INVENTION

The methods and system described herein support hybrid imaging with reduced depth of field, thereby reducing or eliminating the foregoing problems in the prior art. In one aspect, a three-dimensional hybrid imaging system is provided with increased optical-sectioning due to reduced depth of field and increased axial resolution, as compared to the prior art. Such an imaging system is, for example, useful in applications utilizing imaged planes of translucent three-dimensional objects. For example, the system has specific application with multi-level optical disk readers, optical medical (cellular) diagnostics, and microscopy. It is also useful for range determination.

In one aspect, a hybrid imaging system is provided for imaging an object onto an image plane. A traditional imaging system has a defined value of axial resolution. The hybrid imaging system includes a modification of the traditional optical arrangement and is configured to form an intermediate image of the object at an intermediate image plane. A digital processing arrangement is configured to receive the intermediate image and to form a final image of the object. An optical element cooperates with the optical arrangement and the digital processing arrangement such that the axial resolution is increased over and above the defined value of the traditional imaging system.

In another aspect, the optical element is configured to cooperate with the optical arrangement and the digital processing arrangement such that the depth of field is reduced below the defined value.

In still another aspect, a method is provided for imaging an object onto an image plane, including the steps of: (1) forming an intermediate image of the object at an intermediate plane by one or more optical elements defining a first depth of field; (2) perturbing a phase function of electromagnetic energy forming the intermediate image by a specially designed optical element; (3) digitally processing the intermediate image to form a final image such that the one or more optical elements and the specially designed optical element define a second depth of field that is less than the first depth of field.

In one aspect, the electromagnetic energy comprises a spectrum of light, such as a visible light spectrum or an infrared light spectrum. The spectrum of light can have a range of incoherent wavelengths.

In one aspect, the specially designed optical element comprises a rectangular phase plate with a two-dimensional plate function P(x,y). In one aspect, the phase function is randomized. In another aspect, the phase plate is a phase grating. In still another aspect, the specially designed optical element is formed by one or more optical elements and/or optical surfaces, in reflection, diffraction or refraction.

In a further aspect, the method includes the step of configuring the specially designed optical element to cooperate with the step of digitally processing such that the final image formed from one portion of the object is in focus while the final image formed from adjacent portions of the object is out of focus.

BRIEF DESCRIPTION OF THE DRAWINGS

The present invention may be understood by reference to the following detailed description taken in conjunction with the drawings briefly described below.

DETAILED DESCRIPTION OF THE PREFERRED EMBODIMENTS

Figure 1A:
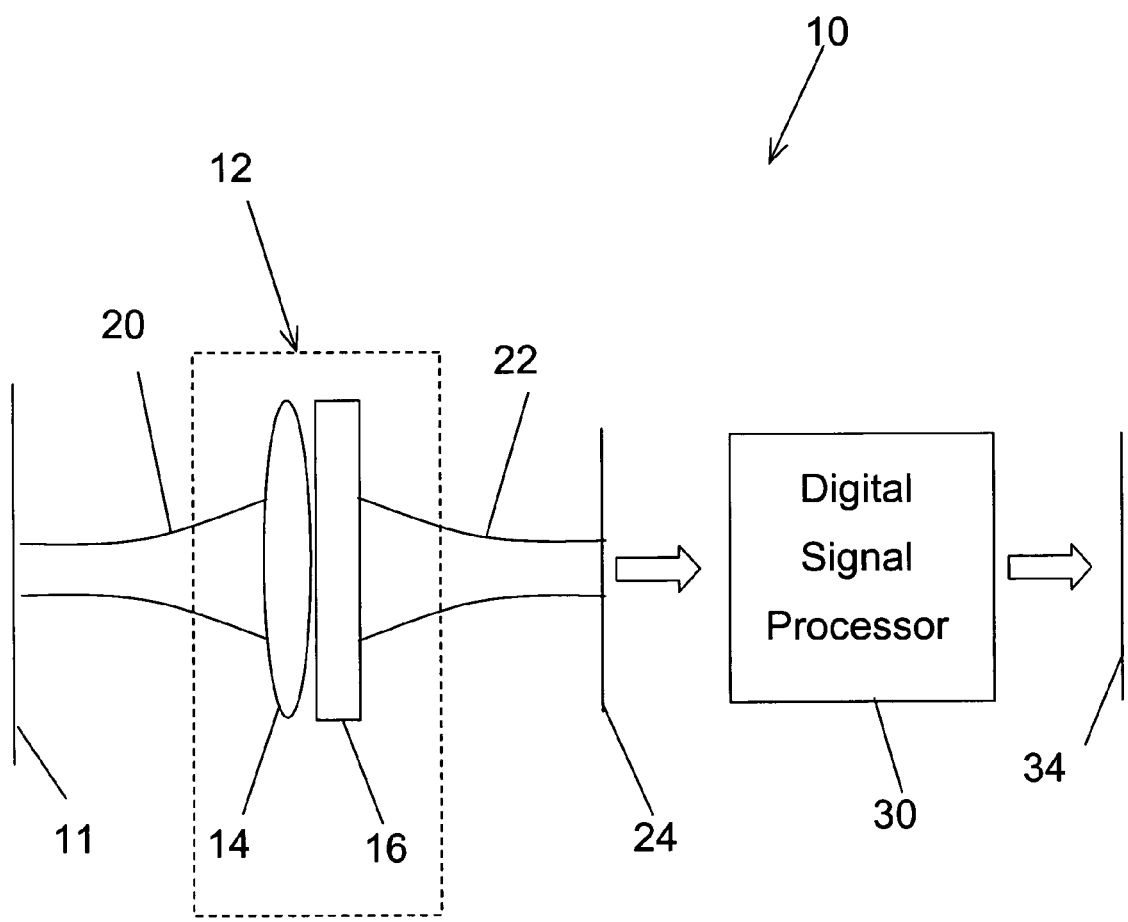
FIG. 1A is a schematic diagram of one hybrid imaging system.

A hybrid imaging system combines a modified optical imaging system with digital processing; the modified optical imaging system is a standard optical imaging system modified with a specially designed optical element (hereinafter a "SDO element"). Unlike a standard imaging system that is cascaded with digital post-processing, in which the image acquired by the standard imaging system is manipulated in digital post-processing, the final image in the hybrid imaging system is obtained by digitally processing an intermediate optical image formed by the modified optical imaging system. Digital processing of the intermediate image makes the hybrid imaging system advantageous, among other reasons, because additional degrees of freedom are provided to improve its imaging performance beyond the best feasible performance of a comparable standard imaging system.

The SDO element is configured within the optical imaging system so as to produce an intermediate image which, with the digital processing, results in a final image that is sharp and in focus for a particular object range while other object ranges differ from the in-focus image more than in the standard optical imaging system. In one embodiment, the SDO element is a specially designed phase plate. In another embodiment, the SDO element is a combination of optical components designed to affect the phase of light transmitted therethrough in a specific way. The SDO element may be a refractive element, diffractive element, or a combination of refractive and/or diffractive elements. The SDO element may be a stand-alone physical element or one or more optical surfaces. The SDO element may be disposed in the optical imaging system at a location between the object being imaged and the image plane; a detector typically resides at the image plane to capture the intermediate image of the object. The SDO element may also be placed at or near to the aperture stop, or at or near to the image of the aperture stop, of the incoherent hybrid imaging system.

A shows one hybrid imaging system 10. Hybrid imaging system 10 includes a modified optical imaging system 12. Modified optical imaging system 12 has a lens 14 and a phase plate 16; phase plate 16 is positioned at the exit pupil of lens 14. Phase plate 16 is an example of an SDO element. Modified imaging system 12 accepts input light 20 from an object 11 and forms an output light 22 to form an intermediate image 24. Intermediate image 24 is then processed by a digital signal processor 30 to form a final image 34.

Figure 1B:
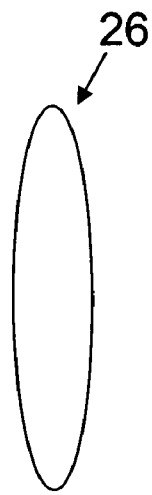
FIG. 1B shows a refractive element that is an example of an SDO element.
Figure 1C:
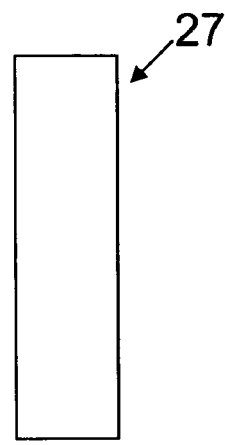
FIG. 1C shows a diffractive element that is an example of an SDO element.
Figure 1D:
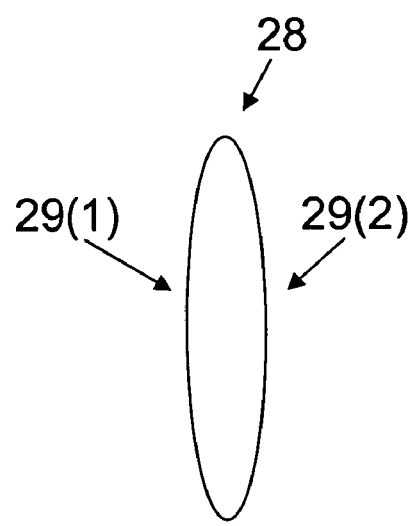
FIG. 1D shows a single optical element that is an example of an SDO element.
Figure 1E:
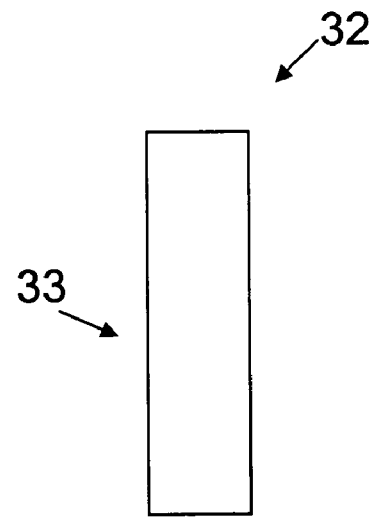
FIG. 1E shows a single optical element that is an example of an SDO element.

FIG. 1B shows a refractive element 26 that is an example of an SDO element. FIG. 1C shows a diffractive element 27 that is an example of an SDO element. FIG. 1D shows a single optical element 28 that is an example of an SDO element. Single optical element 28 has optical surfaces 29(1) and 29(2); either of surfaces 29(1) and 29(2) may be a diffractive surface, so that single optical element 28 may have one or both of refractive and diffractive qualities. FIG. 1E shows a single optical element 32 that is an example of an SDO element. Single optical element 32 has a reflective surface 33.

Those skilled in the art appreciate that light 20 is electromagnetic radiation with a range of wavelengths, for example visible light (e.g., 400–750 nm) or infrared light (e.g., 8–12 microns). Those skilled in the art also appreciate that phase plate 16 can be positioned at other locations, for example at the image of the exit pupil, at or near an aperture stop (not shown) of system 10, or at or near to the image (not shown) of the aperture stop. Further, those skilled in the art appreciate that lens 14 may be a single lens or represent a series of optical elements that cooperate to form image 24.

Hybrid imaging system 10 does not substantially decrease optical power at the image plane by use of phase plate 16, as compared to use of an amplitude plate or a complex plate in the prior art. Phase plate 16 does attenuate the MTF of lens 14, thereby attenuating most frequency components in the image. Phase plate 16 may also distort the phase of the OTF of lens 14. Accordingly, digital signal processor 30 in one embodiment incorporates a restoration digital filter that amplifies the attenuated frequency components of intermediate image 24 and, if necessary, corrects the phase of those frequency components. For example, the digital signal processor of one embodiment amplifies the attenuated frequency components of the intermediate image—and, if desired, corrects the phase of the components—with a linear frequency-domain inverse filter having a frequency response of:

$$H_{Inverse}(f_x, f_y) = \begin{cases} \frac{H_{Clear\,aperture}(f_x, f_y)}{H_{Phase\,plate}(f_x, f_y)}, & H_{Phase\,plate}(f_x, f_y) \neq 0 \\ 0, & H_{Phase\,plate}(f_x, f_y) \neq 0 \end{cases} \quad (1)$$

where $H_{Clear\,aperture}(f_x, f_y)$ is the in-focus OTF of lens 14 with a clear aperture (i.e., without phase plate 16 at its exit pupil) and $H_{Phase\,plate}(f_x, f_y)$ is the in-focus OTF of modified optical imaging system 12 with phase plate 16 at the exit pupil. Since the inverse filter, $H_{Phase\,plate}(f_x, fy)$, is a high-pass filter, it reduces the overall system signal-to-noise ratio. Those skilled in the art appreciate that nonlinear signal processing can be used to reduce noise.

Although phase plate 16 is shown as a single element in FIG. 1, those skilled in the art appreciate that phase plate 16 may be a combination of optical elements designed to cooperate to yield the desired phase effect. Phase plate 16 may be refractive, diffractive or a combination of refractive and diffractive optical surfaces or physical elements.

As described below, phase plate 16 can be designed in a variety of ways to reduce the depth of field of hybrid imaging system 10. In one embodiment, phase plate 16 is a rectangular phase plate with a two-dimensional plate function P(x,y). Since two-dimensions plate function P(x,y) is mathematically separable, between x and y, only one dimension is discussed below.

Random Optical Plate Approach

The OTF of an incoherent optical system, as a function of defocus, can be shown as:

$$H(u, \psi) = \int_{-(1-u/2)}^{(1-u/2)} \left( P(x+u/2)e^{j(x+u/2)^2\psi} \right) \left( P^*(x-u/2)e^{-j(x-u/2)^2\psi} \right) dz, \quad (2)$$
$$|u| \leq 2$$

where * denotes complex conjugate, and P(x) is the optical plate function:

$$P(x) = \begin{cases} e^{j\theta(x)}, & \text{for } |x| \leq 1 \\ 0, & \text{otherwise} \end{cases} \quad (3)$$

where $j=\sqrt{-1}$ and $\theta(x)$ is some unspecified function. Since the magnitude of P(x) is unity, we are considering only phase plates that theoretically absorb no optical power. The defocus parameter $\psi$ is given by:

$$\psi = \frac{\pi D^2}{4\lambda}\left(\frac{1}{f} - \frac{1}{d_o} - \frac{1}{d_i}\right) = \frac{2\pi}{\lambda}W_{20} = kW_{20} \quad (4)$$

where D is the diameter of the lens and $\lambda$ is the wavelength of the light. The distance $d_o$ is measured between object 11 and the first principal plane of lens 14, while $d_i$ is the distance between the second principal plane of lens 14 and image plane, at which intermediate image 24 is located. The quantity f is the focal length of lens 14. The wavenumber is given by k while the defocus aberration constant is given by $W_{20}$.

The ambiguity function is given by:

$$A(u, v) = \int_{-(1-u/2)}^{(1-u/2)} P(x+u/2)P^*(x-u/2)e^{j2\pi vx}dx, \quad |u| \leq 2 \quad (5)$$

The OTF and the ambiguity function are related by:

$$H(u, \psi) = A(u, u\,\psi/\pi), \quad |u| \leq 2 \quad (6)$$

In other words, the projection of a radial slice of slope $\psi/\pi$ of the ambiguity function onto the horizontal u-axis yields the OTF for defocus parameter $\psi$.

From Equations (5) and (3), we can consider the ambiguity function as a series of Fourier transforms of a function Qu(x) given by:

$$Q_u(x) = P(x+u/2)P^*(x-u/2) = e^{j\Theta(x)}, \quad |x| \leq 1, \quad |u|\,|x| \leq 1, \leq 2 \quad (7)$$

$$\Theta(x) = \theta(x+u/2) - \theta(x-u/2), \quad |x| \leq 1, \quad |u| \leq 2 \quad (8)$$

It can be shown that, if the OTF is to change a maximum amount as a function of defocus parameter $\psi$, then the Fourier transform of Qu(x) may also change a maximum amount as a function of the Fourier variable. If Qu(x) is a stationary random variable, then the Fourier transform of Qu(x) may be uncorrelated as a function of the Fourier variable. Equivalently, the transformed random variables (i.e., ambiguity functions) A(u,v) and A(u,v+γ) may be uncorrelated for a given (u,v) and small γ. Therefore, an uncorrelated ambiguity function leads to an incoherent optical system 10 with a reduced depth of field.

If Qu(x) from Equation (7) is chosen as a continuous uncorrelated zero-mean Gaussian random variable with variance $\sigma^2$, then the one-dimensional autocorrelation of the related ambiguity function is:

$$EA(u, v)A^*(u, v + \gamma) = \qquad (9)$$

$$E \int_{-(1-u/2)}^{(1-u/2)} \int_{-(1-u/2)}^{(1-u/2)} Q_u(x) Q_u^*(y) e^{j2\pi vx} e^{-j2\pi(v+\gamma)y} dx dy,$$

$$|u| \leq 2$$

where E denotes expected value. Since Qu(x) is an uncorrelated random variable, then:

$$EQu(x)Q_u^*(y) = \begin{cases} \sigma^2 & \text{for } x = y \\ 0 & \text{otherwise} \end{cases} \qquad (10)$$

$$EA(u, v)A^*(u, v + \gamma) = \sigma^2 \int_{-(1-u/2)}^{(1-u/2)} e^{-j2\pi\gamma x} dx, \quad |u| \leq 2$$

$$= \sigma^2 (2 - u) \operatorname{sinc}(2\pi\gamma(1 - u/2)), \quad |u| \leq 2 \qquad (11)$$

where sinc (x)=sin(x)/x. The one-dimensional autocorrelation of the random ambiguity function is then distributed with a sinc profile.

The expected power of the random ambiguity function is given by:

$$E|A(u, v)|^2 = E \int_{-(1-u/2)}^{(1-u/2)} \int_{-(1-u/2)}^{(1-u/2)} Q_u(x) Q_u^*(y) e^{j2\pi vx} e^{-j2\pi vy} dx dy, \qquad (12)$$

$$|u| \leq 2$$

$$= \sigma^2 \int_{-(1-u/2)}^{(1-u/2)} dx, \quad |u| \leq 2$$

$$= \sigma^2 (2 - u), \quad |u| \leq 2$$

From the above arguments, it is shown that, if the function Qu(x) is a uncorrelated zero-mean Gaussian random variable, then the expected power of the corresponding random ambiguity function has a triangular profile in the u dimension and is constant in the v dimension.

We can construct an approximately uncorrelated Gaussian random variable Qu(x) by selecting θ(x) from Equation (8) as a zero-mean Gaussian random variable with variance $\sigma^2$ and autocorrelation r(τ). From statistical theory, sums of Gaussian random variables are Gaussian distributed. Therefore, Θ(x) from Equation (8) is also Gaussian. It can be shown that the autocorrelation of the transformed random variable $e^{j\Theta(x)}$ is then:

$$E \; e^{j\Theta(x)} e^{-j\Theta(x-\tau)} = e^{-2\sigma^2(1-r(\tau))} \qquad (13)$$

If the random variable θ(x) is uncorrelated, then r(τ)=δ(τ), where δ(τ) is the Dirac delta function. The autocorrelation of $e^{j\Theta(x)}$ then becomes:

$$E e^{j\theta(x)} e^{-j\theta(x-\tau)} = \begin{cases} 1 & \text{for } \tau = 0 \\ e^{-2\sigma^2} & \text{otherwise} \end{cases} \qquad (14)$$

Hence, when θ(x) is uncorrelated and has a large variance; $e^{j\Theta(x)}$ is also approximately uncorrelated. From Equations (9) and (11), the resulting random ambiguity function will also be approximately uncorrelated, and the phase function θ(x) will produce an incoherent optical system that maximally changes as a function of defocus parameter or object range.

Figure 2:
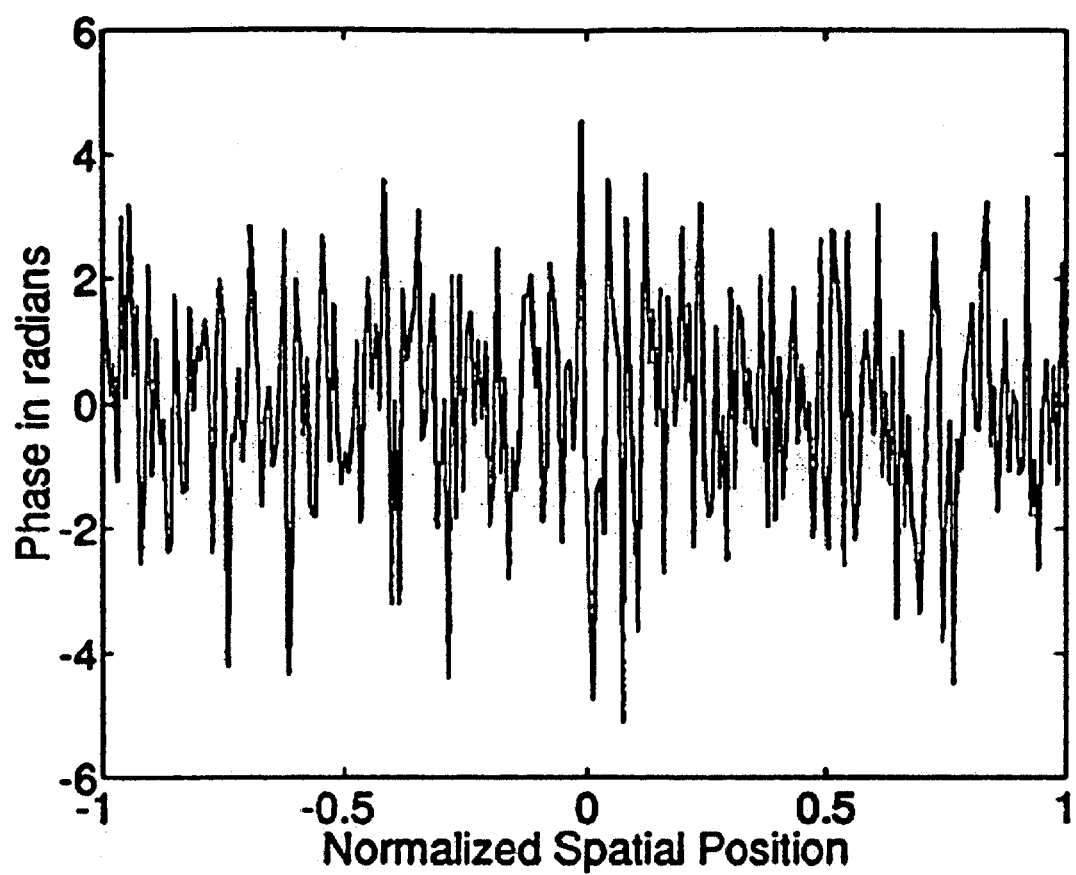
FIG. 2 shows a graph of an uncorrelated zero-mean Gaussian random phase function with variance of p, to illustrate one phase function suitable for use within a phase plate in the hybrid imaging system of FIG. 1.

Turning now to FIG. 2, one random phase function θ(x) suitable for use in phase plate 16 of hybrid imaging system 10 is shown. Phase function θ(x) has been chosen to be an uncorrelated zero-mean Gaussian random phase function with variance of π.

Figure 3:
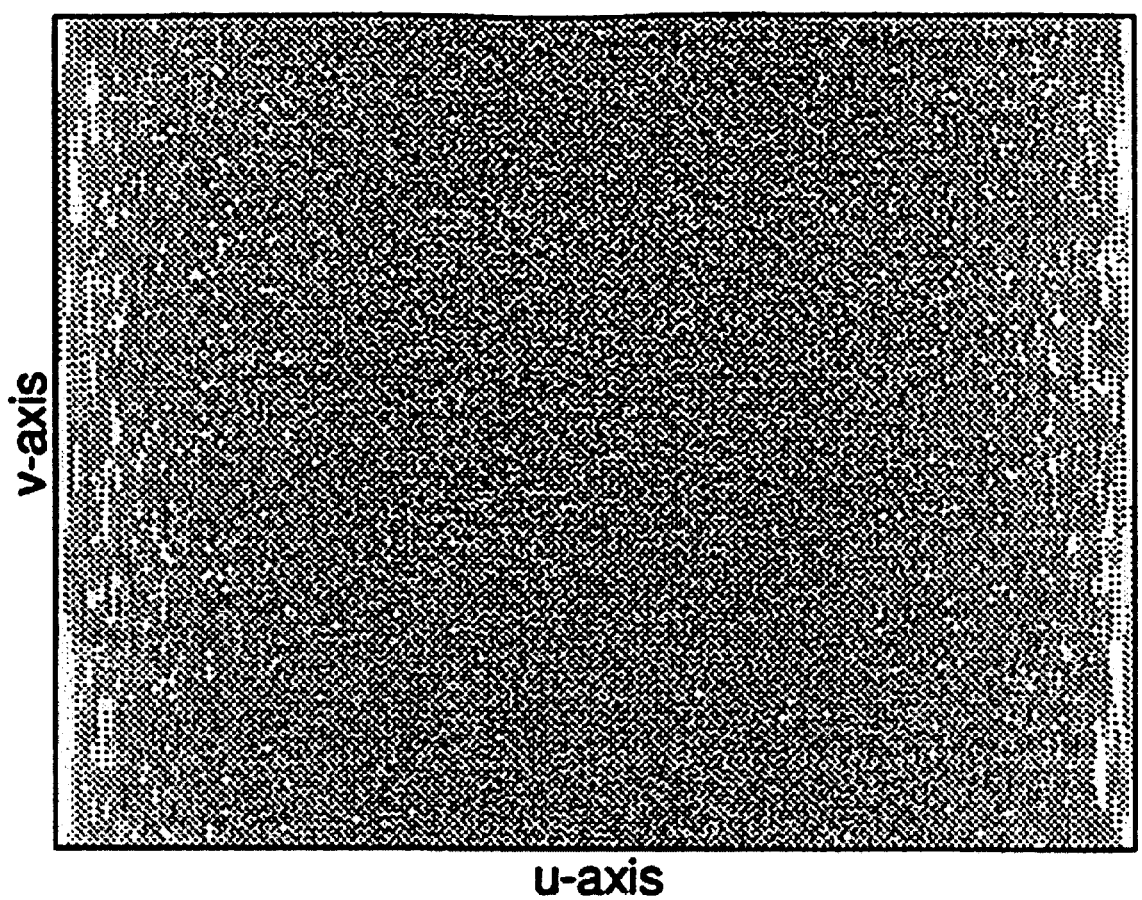
FIG. 3 is a computer-generated graph of the magnitude of the ambiguity function of the random phase plate of FIG. 2.

The ambiguity function corresponding to the phase function of FIG. 2 is shown in FIG. 3. As expected, the ambiguity function shown in FIG. 3 is uniformly spread in the v-axis direction while decreasing in the u-axis direction. This ambiguity function also appears very "noise-like." Even to the eye, the correlation between adjacent points of this ambiguity function appears to be low.

Figure 4:
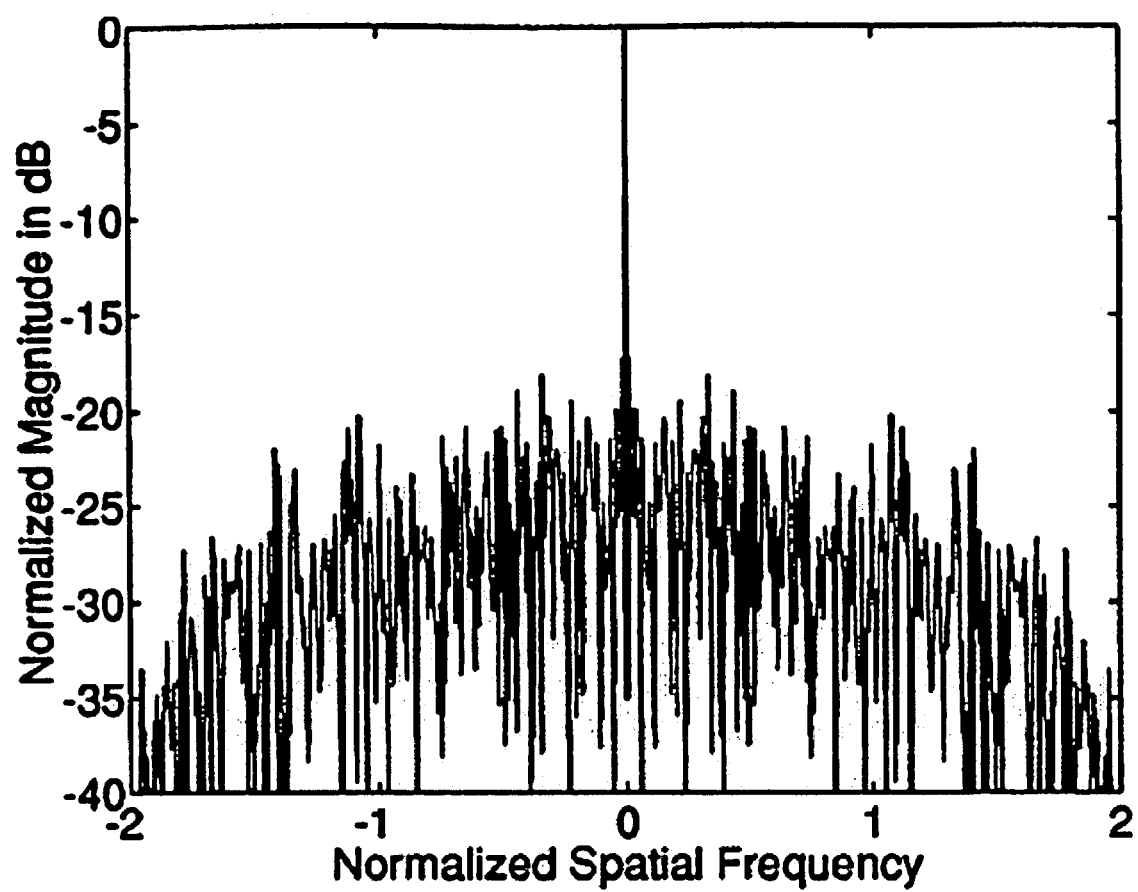
FIG. 4 is a computer-generated graph of the in-focus optical transfer function from the random phase plate of FIG. 2.

The in-focus OTF corresponding to the random phase plate of FIG. 2 is shown in FIG. 4. This OTF also appears to be noise-like, as desired. The level of this particular OTF is low, but it may be increased by forming the random phase function θ(x) with a specific autocorrelation such that $e^{j\Theta(x)}$ has a low-pass power spectrum. When θ(x) is uncorrelated, $e^{j\Theta(x)}$ has an approximately white power spectrum. The digital processing used in processor 30 may then incorporate an inverse filter of this OTF, or another defocused OTF. In effect, system focus is altered not by movement of lens 14 but by digital filtering with the inverse of different defocused OTFs.

Figure 5:
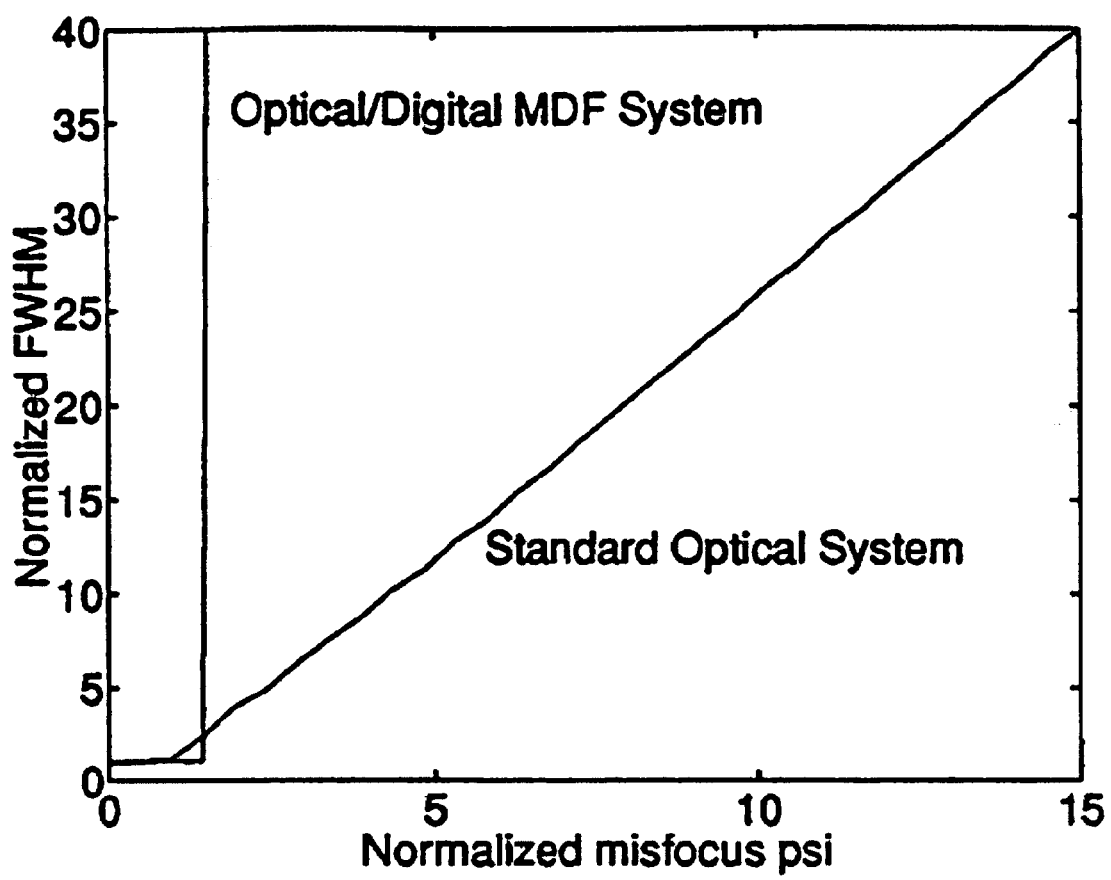
FIG. 5 is an illustration comparing the best possible full-width half maximum of the hybrid imaging system of FIG. 1 to a standard optical imaging system in the prior art.

A succinct measure of the performance of a reduced depth of field hybrid imaging system 10 is the full width at half maximum (FWHM) amplitude of the resulting PSF. The FWHM measure can be applied to hybrid imaging systems when the PSF exhibits a main lobe. The FWHM measure of the reduced depth of field hybrid imaging system may sharply increase as a function of defocus parameter in comparison to a standard imaging system. An illustration of the best possible FWHM of the hybrid imaging system 10 of FIG. 1 and that of a standard optical imaging system is shown in FIG. 5. The width of the in-focus PSF of the standard optical imaging system has been normalized to unity. As expected from geometrical optics, the width of the PSF from the standard optical imaging system increases linearly beyond the value of its nominal depth of field. This value can theoretically be shown to approximately equal ψ=1; this value is also very close to the simulated depth of field, using the FWHM criteria, of the standard optical imaging system. The width of the PSF from hybrid imaging system 10 sharply increases beyond a threshold defocus value. This threshold defocus value is a function of the variance and autocorrelation θ(x). Hybrid imaging system 10 will therefore image at a plane 11 in object space with approximately diffraction limited resolution. Objects not at this plane will form maximally blurred images.

Phase Grating Approach

Referring briefly again to FIG. 1, hybrid imaging system 10, which includes phase plate 16 in modified optical imaging system 12, produces a blurred intermediate image 24. A specific restoration digital filter may then be used to amplify the attenuated frequency components of intermediate image 24—and, if desired, correct the phase of those frequency components—thereby obtaining an in-focus final image 34. The degree of digital restoration of an out-of-focus object depends on the similarity between the in-focus digital filter used and the out-of-focus digital filter required.

The angle in Hilbert space between any two functions is a measure of the similarity between these functions. The smaller the angle between the two functions, the more similar the two functions. Therefore, rather than using the defocus parameter, this angle in Hilbert space between a defocused PSF and the in-focus PSF can be used as a metric to quantify the blurring of a defocused image.

Although Hilbert space is used in the following analysis, other spaces can also be used to attain similar results. This angle $0 \leq \theta \leq \pi/2$ is defined for any defocus parameter value $\psi$ as $$\cos\theta = \frac{\langle |h(u, 0)|^2, |h(u, \psi)|^2 \rangle}{\| |h(u, 0)|^2, |h(u, \psi)|^2 \|}, \quad (15)$$

where the inner product of the in-focus PSF $|h(u,0)|^2$ and a defocused PSF $|h(u,\psi)|^2$ is defined as $$\langle |h(u, 0)|^2, |h(u, \psi)|^2 \rangle = \int_{-\infty}^{\infty} |h(u, 0)|^2 |h(u, \psi)|^2 du. \quad (16)$$

Also, the length in Hilbert space of the in-focus PSF is defined as $$\| |h(u, 0)|^2 \| = \left[ \int_{-\infty}^{\infty} |h(u, 0)|^2 |h(u, 0)|^2 du \right]^{\frac{1}{2}}, \quad (17)$$

and the length in Hilbert space of the defocused PSF is defined as $$\| |h(u, \psi)|^2 \| = \left[ \int_{-\infty}^{\infty} |h(u, \psi)|^2 |h(u, \psi)|^2 du \right]^{\frac{1}{2}}. \quad (18)$$

As a measure of the similarity between a defocused PSF and the in-focus PSF, the angle $\theta$ is a more general metric to quantify the blurring of a defocused image than the defocus parameter $\psi$, which, for a given imaging system, is a measure of the defocus distance only.

The PSF of a defocused imaging system with a rectangular aperture can be written as:

$$|h(u, v, \psi_x, \psi_y)|^2 = \left| \kappa \int_{-1}^{1} \int_{-1}^{1} \exp\left\{ j(\psi_x x^2 + \psi_y y^2) - jk\left( \frac{u x_{\max} x}{z_i} + \frac{u y_{\max} y}{z_i} \right) \right\} dx dy \right|^2, \quad (19)$$

where $\psi_x$ and $\psi_y$ are the defocus parameters in the directions x and y, respectively, $x_{max}$ and $y_{max}$ are the half-widths of exit pupils in the directions x and y, respectively and $\kappa$ is a constant. Since the defocused PSF of Eq. (19) is mathematically separable, we can restrict our analysis to a one-dimensional defocused PSF. We introduce a phase plate $f(x)$ (e.g., phase plate 16) at the exit pupil and we drop all multiplicative constants, yielding:

$$|h(u, \psi_x)|^2 = \left| \int_{-1}^{1} \exp\left\{ j(\psi_x x^2) - jk\left( f(x) + \frac{u x_{\max} x}{z_i} \right) \right\} dx \right|^2. \quad (20)$$

For reduced depth of field, a phase plate function $f(x)$, which results in maximum image blurring at a slightly defocused plane (specified by relatively small defocus parameter value), is desired. To obtain the desired phase plate function $f(x)$ for reducing the depth of field, Equations (15) and (20) can be combined and the optimization problem:

$$\min_{f} \frac{\langle |h(u, 0)|^2, |h(u, \psi)_x|^2 \rangle}{\| |h(u, 0)|^2 \| \| |h(u, \psi_x)|^2 \|} \quad (21)$$

solved for a relatively small value of the defocus parameter $\psi_x$.

The optimization problem of Equation 21 can be solved for $\psi_x=1$, for example, by assuming that the desired phase plate function $f(x)$ is represented as a Fourier series. If the phase plate function $f(x)$ is assumed to be represented as a Fourier series, then the PSF of the hybrid imaging system is consequently an array of narrowly-spaced spots. Such an array of narrowly spaced spots would change its overall shape considerably as the spots spread out and overlap due to propagation. If the location of the image plane is not to change, the phase plate does not have focusing power. For that case, we choose to represent the phase plate function $f(x)$ by an odd Fourier series:

$$f(x) = \sum_{1}^{N} b_n \sin(2\pi n v x). \quad (22)$$

Combining Equations (21) and (22), the optimum values of the fundamental spatial frequency $v$ and the coefficients $b_n$ can be obtained numerically by using the method of steepest descent.

The initial value of $\theta$ in Equation (15) corresponding to a standard optical imaging system with a clear aperture and a defocus value of $\psi_x=1$ is 0.0601 radians. The value of $\theta$ corresponding to a modified imaging system 12 with a sum of sinusoids according to Equation (22) and with a number of coefficients N=1 is 0.1284 radians. When the number of sinusoids is increased to N=5, the value of θ increases to 0.1355 radians, which is a change of only 5.52% from the value of θ corresponding to N=1. Therefore, for example, we restrict the number of phase grating coefficients to N=5.

The values of the fundamental frequency ν and the coefficients $b_n$ corresponding to an F/4 hybrid imaging system are shown in Table 1. Due to the previously discussed mathematical separability of the defocused PSF, the desired two dimensional, rectangular phase plate function for reducing the depth of field can be expressed as $$f(x, y) = \sum_{1}^{5} b_n \sin(2\pi n\nu x) + \sum_{1}^{5} b_n \sin(2\pi n\nu y) \quad (23)$$

Figure 6:
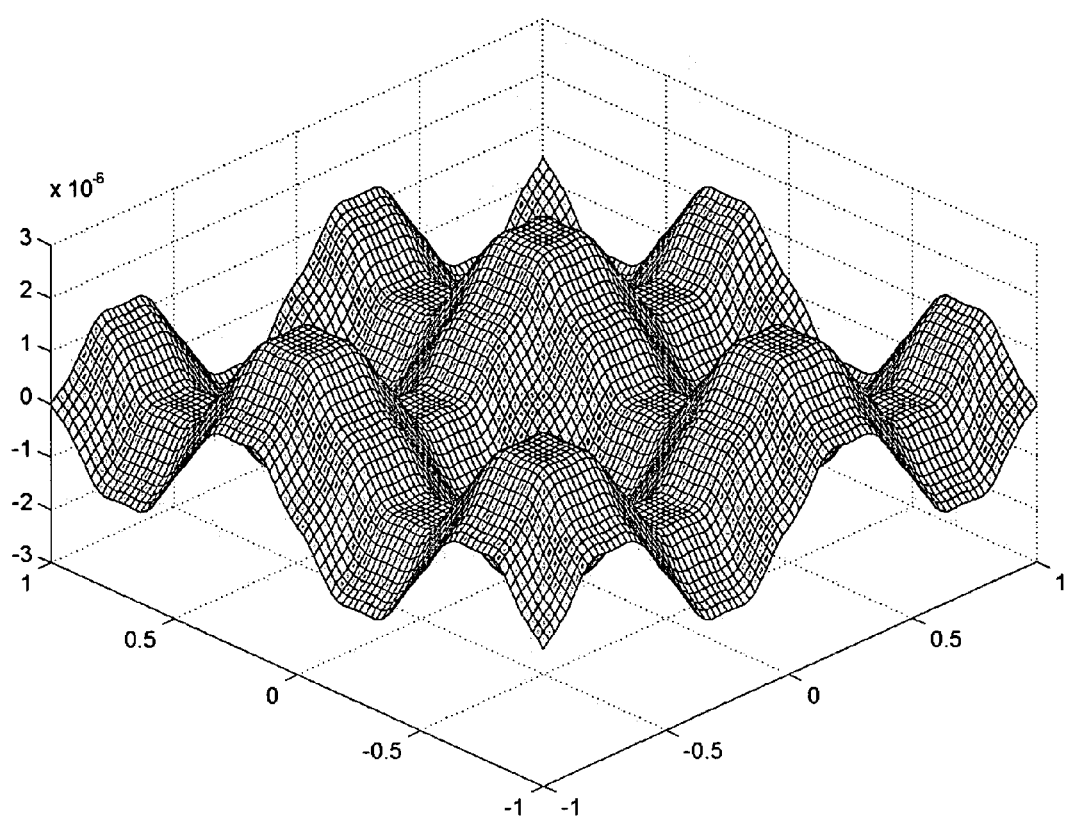
FIG. 6 is a computer-generated profile of a rectangular reduced depth of field phase grating suitable for use in the hybrid imaging system of FIG. 1.
Figure 7A:
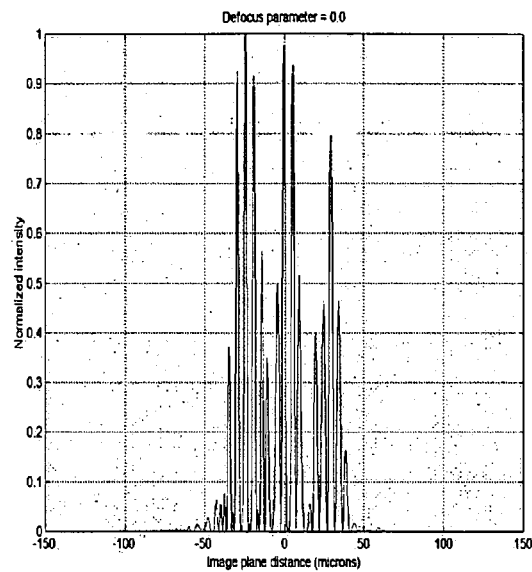
FIGS. 7A–7D are computer generated graphs of the defocused, diffraction limited PSF of the hybrid imaging system of FIG. 1, with a rectangular reduced depth of field phase grating of FIG. 6.
Figure 7B:
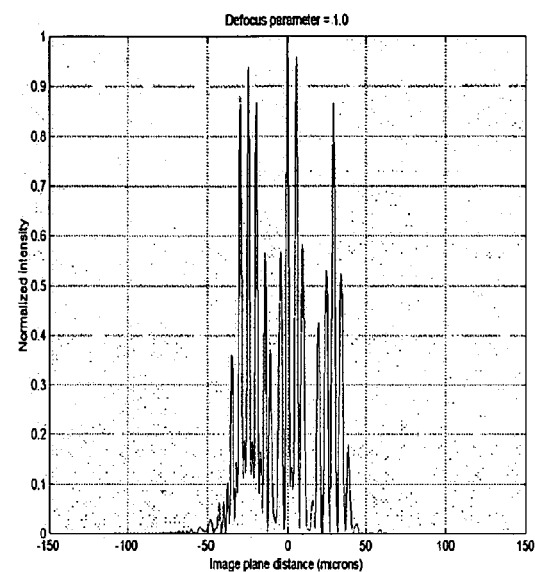
Figure 7C:
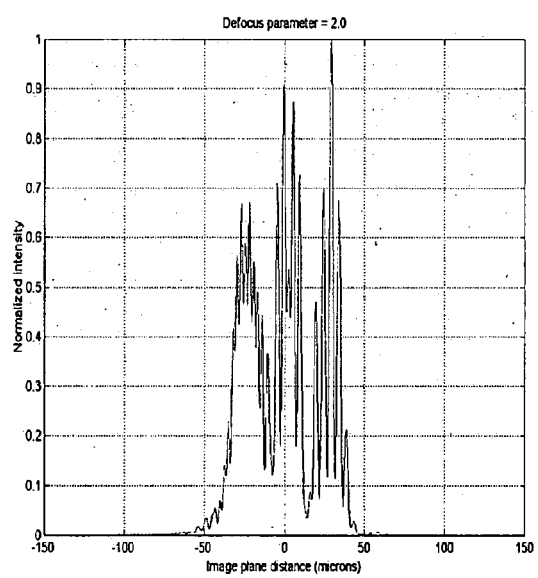
Figure 7D:
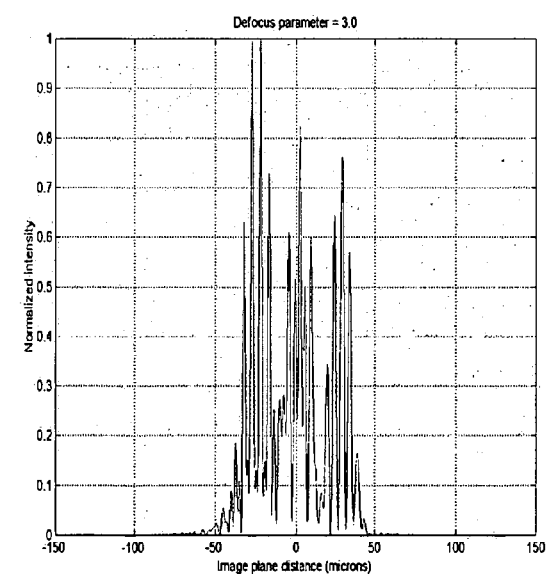
Figure 8A:
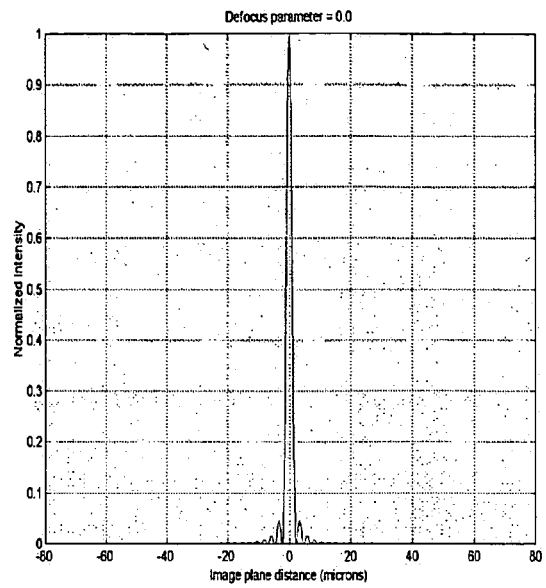
FIGS. 8A–8D are computer-generated graphs of the defocused, diffraction-PSF of a standard imaging system in the prior art without the reduced depth of field phase grating.
Figure 8B:
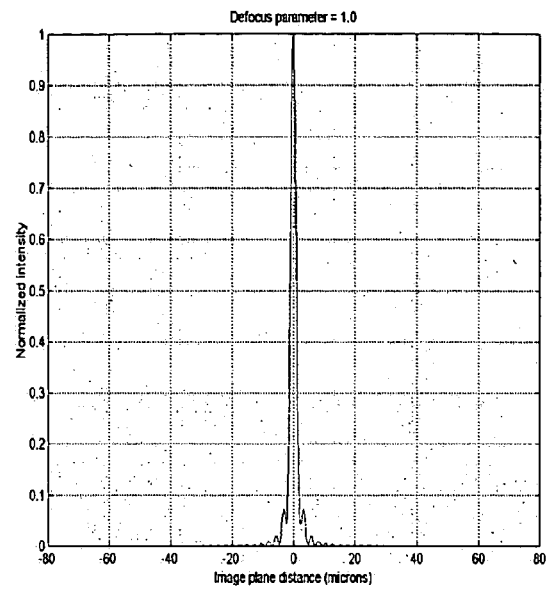
Figure 8C:
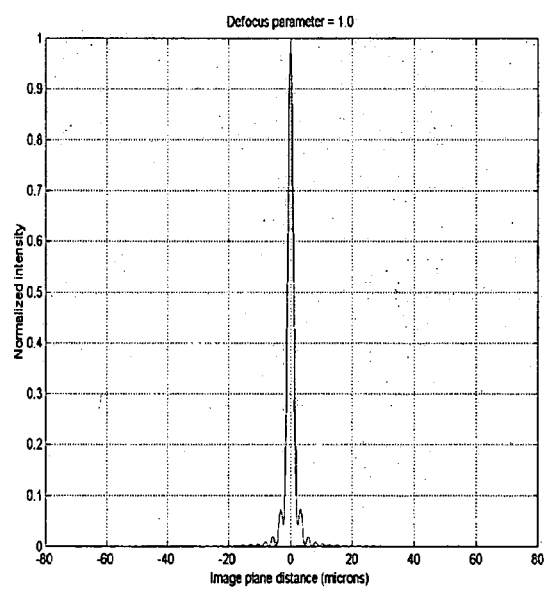
Figure 8D:
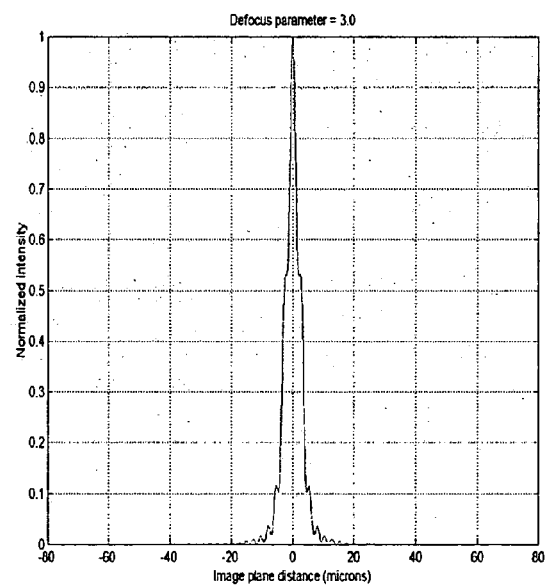

We refer to the phase plate corresponding to ƒ(x, Y), whose coefficients are shown in Table 1, as the rectangular reduced depth of field (RDF) phase grating. The profile of the rectangular RDF phase grating is shown in FIG. 6.

TABLE 1

Rectangular RDF phase grating parameters

| ν(cycles/mm) | $b_1$ (μm) | $b_2$ (μm) | $b_3$ (μm) | $b_4$ (μm) | $b_5$ (μm) |
|---|---|---|---|---|---|
| 1.0400 | 1.1705 | −0.0437 | 0.0271 | −0.0325 | −0.0700 |

FIGS. 7A–7D show the defocused PSF of an F/4 diffraction-limited modified imaging system 12 with a rectangular RDF phase grating 16, with parameters as shown in Table 1, at the exit pupil of system 10.

TABLE 1

Rectangular RDF phase grating optimum parameters

| ν(cycles/min) | $b_1$ | $b_2$ | $b_3$ | $b_4$ | $b_5$ |
|---|---|---|---|---|---|
| 1.0400 | 1.1705 | −0.0437 | 0.0271 | −0.0325 | −0.0700 |

It may be noted that the variation with defocus in the shape of the PSF shown in FIGS. 7A–7D is greater than the variation with defocus in the shape of the PSF of a similar standard diffraction-limited system (without the rectangular RDF phase grating—i.e., "clear aperture"), as shown in FIGS. 8A–8D.

Figure 9:
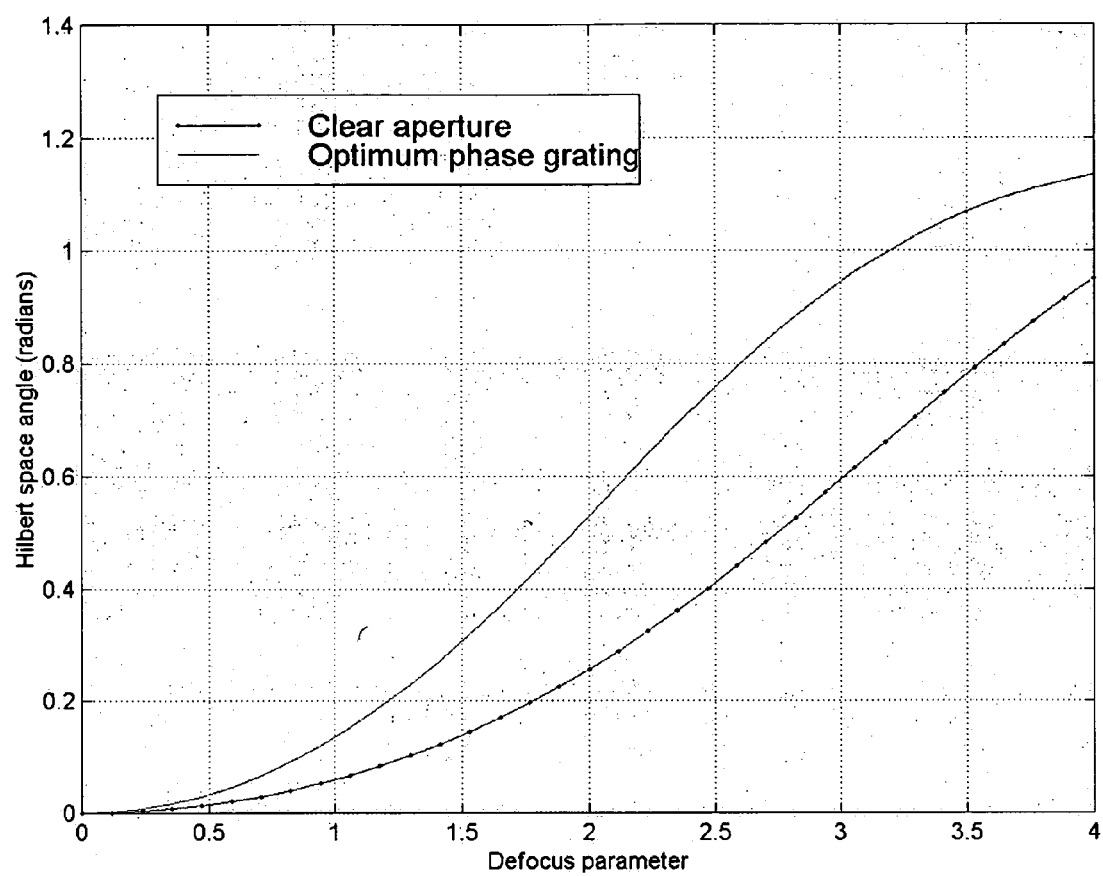
FIG. 9 is a computer-generated graph of the diffraction-limited Hilbert space angles for an optical imaging system with and without a reduced depth of field phase grating.
Figure 10A:
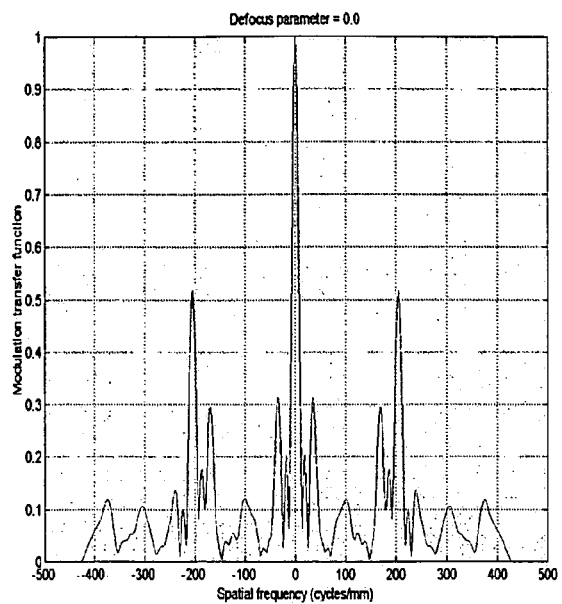
FIGS. 10A–10D are computer generated graphs of the modulation transfer function (MTF) of a defocused, diffraction-limited imaging system that includes the reduced depth of field phase grating.
Figure 10B:
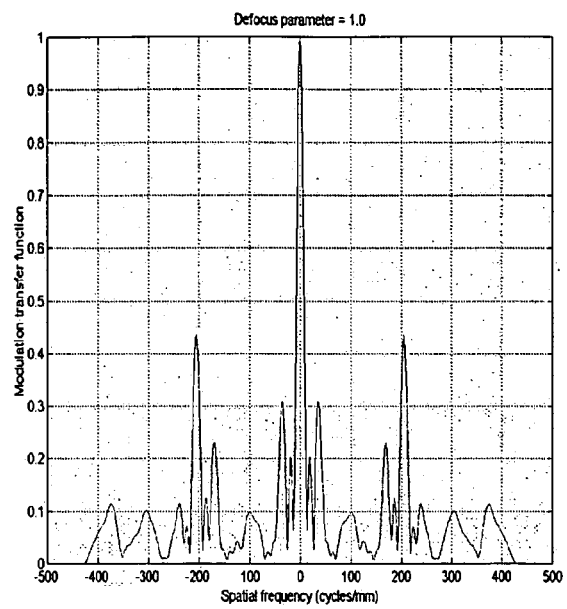
Figure 10C:
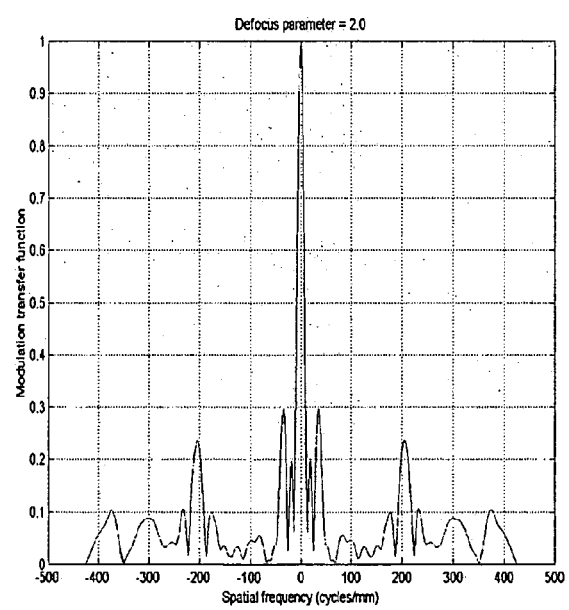
Figure 10D:
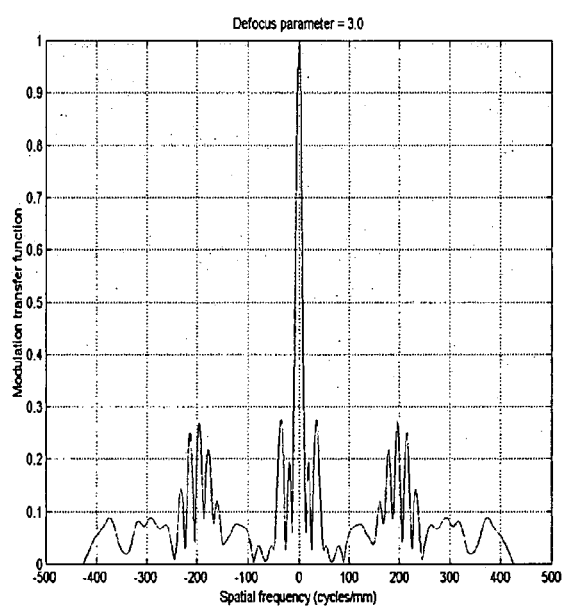
Figure 11A:
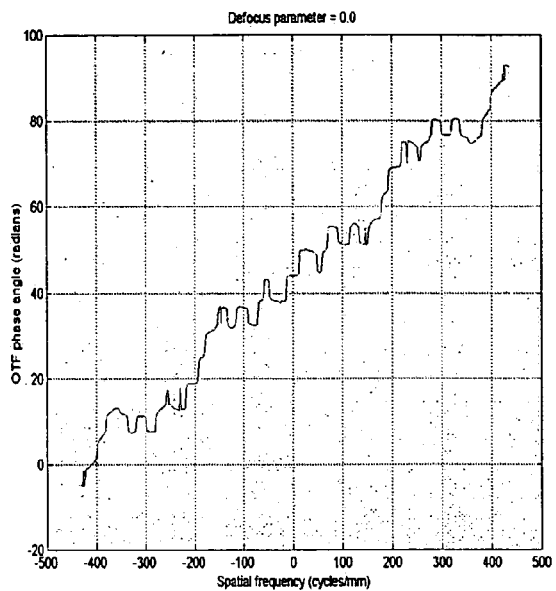
FIGS. 11A–11D are computer generated graphs of the phase angles of the optical transfer function (OTF) of a defocused, diffraction-limited imaging system that includes the reduced depth of field phase grating.
Figure 11B:
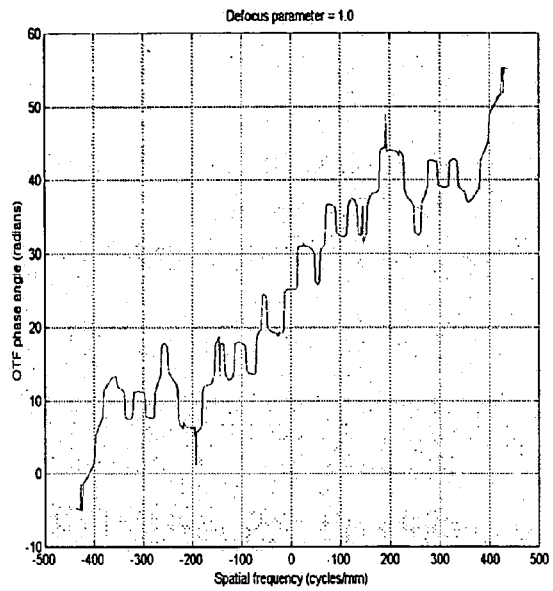
Figure 11C:
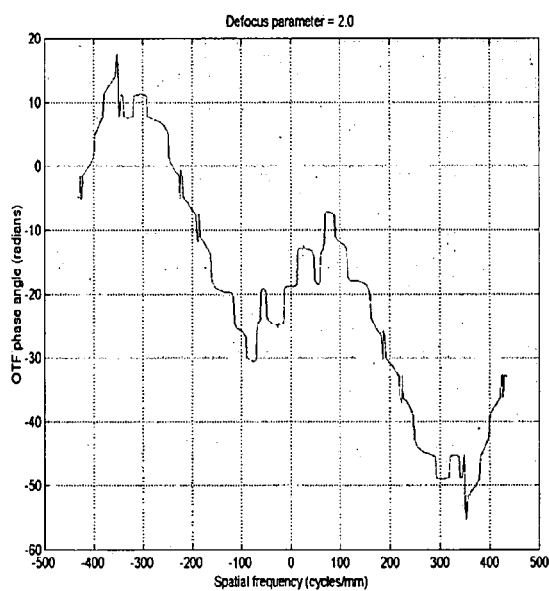
Figure 11D:
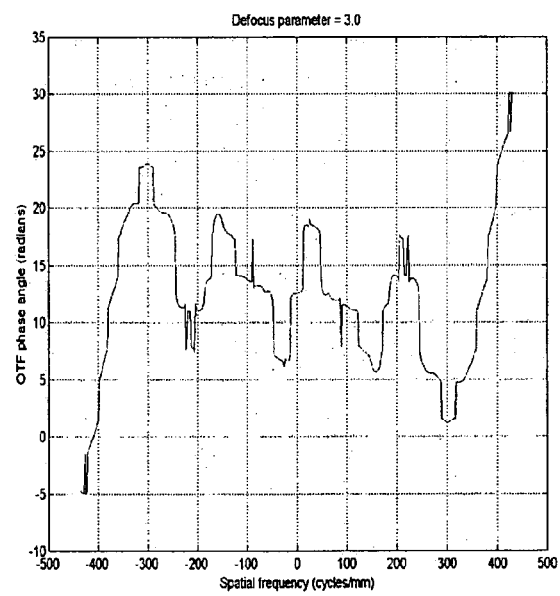
Figure 12A:
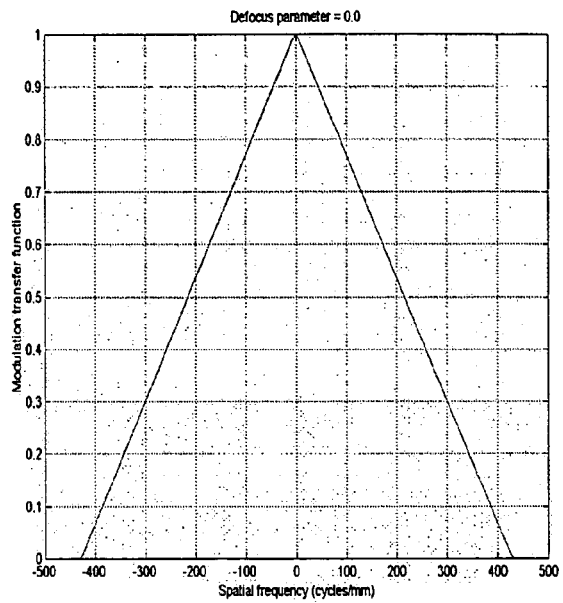
FIGS. 12A–12D are computer generated graphs of the MTF of a defocused, diffraction-limited imaging system without the reduced depth of field phase grating.
Figure 12B:
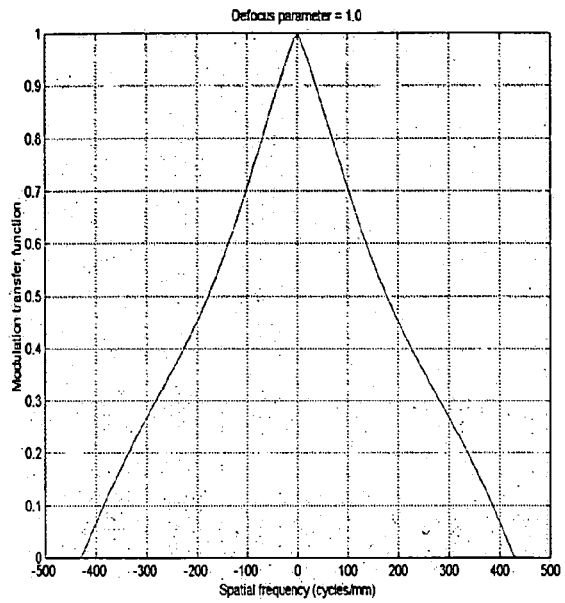
Figure 12C:
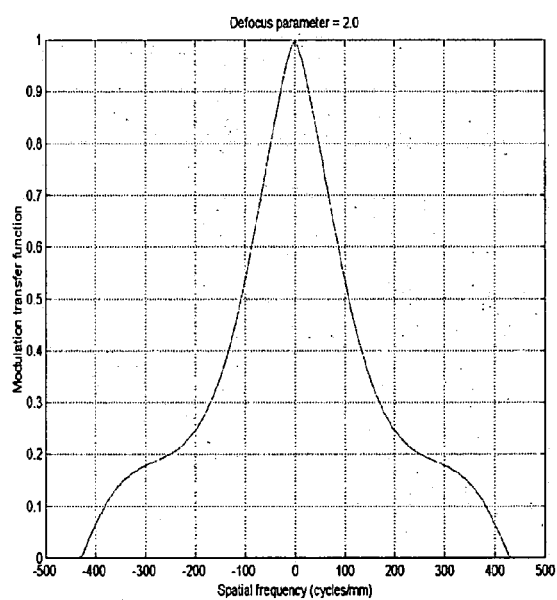
Figure 12D:
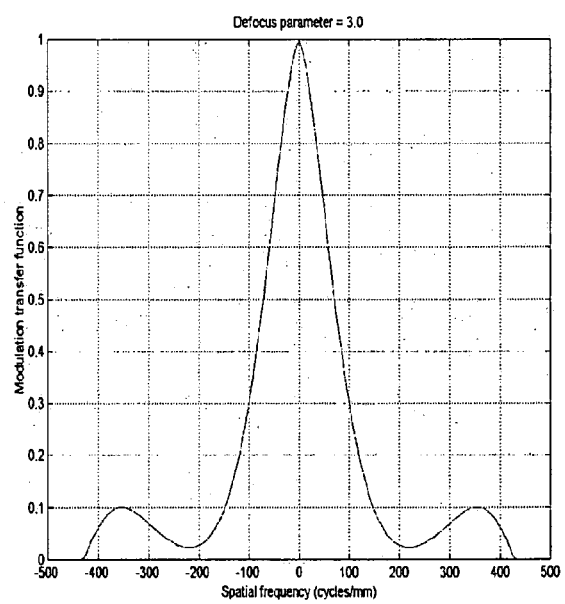
Figure 13A:
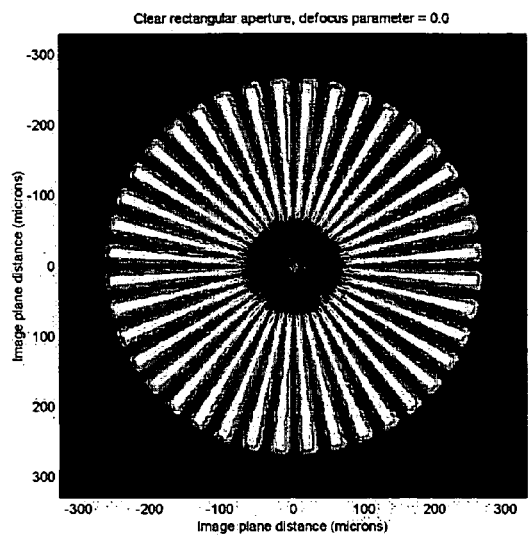
FIGS. 13A–13H are computer generated images of a spoke target for a defocused, diffraction-limited hybrid imaging system with and without the reduced depth of field phase grating.
Figure 13B:
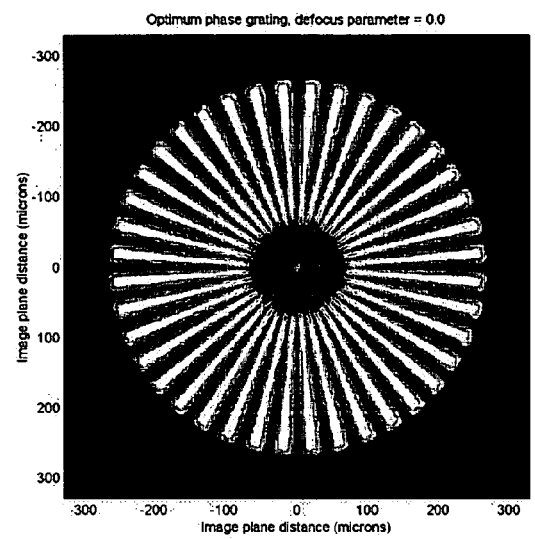
Figure 13C:
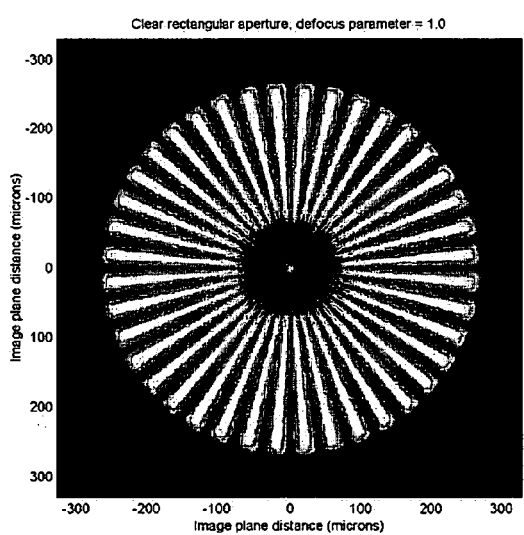
Figure 13D:
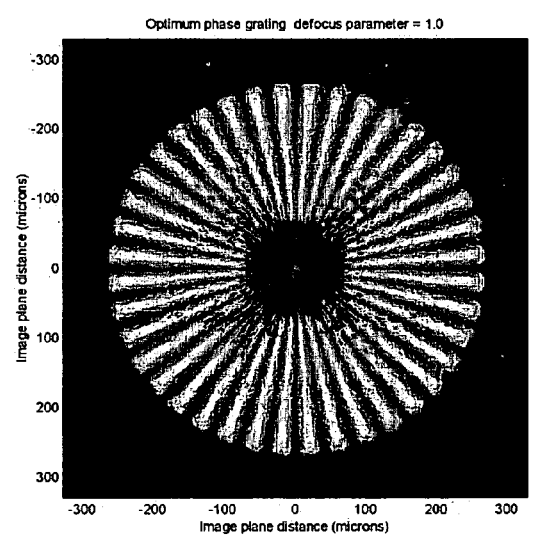
Figure 13E:
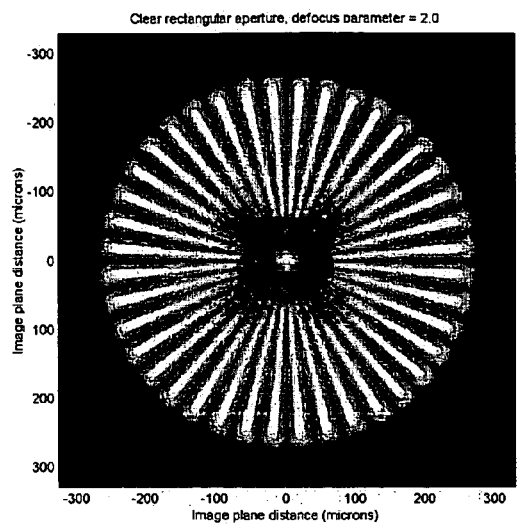
Figure 13F:
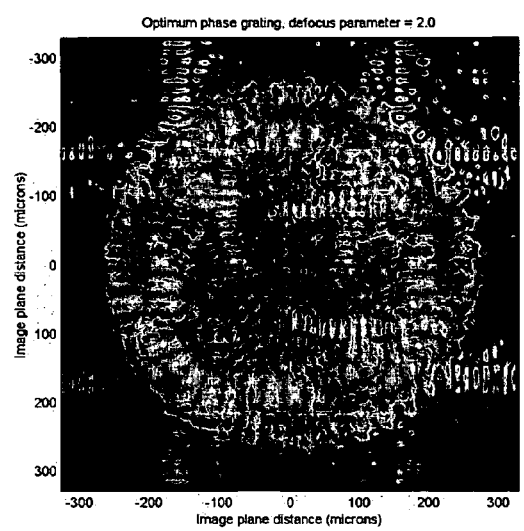
Figure 13G:
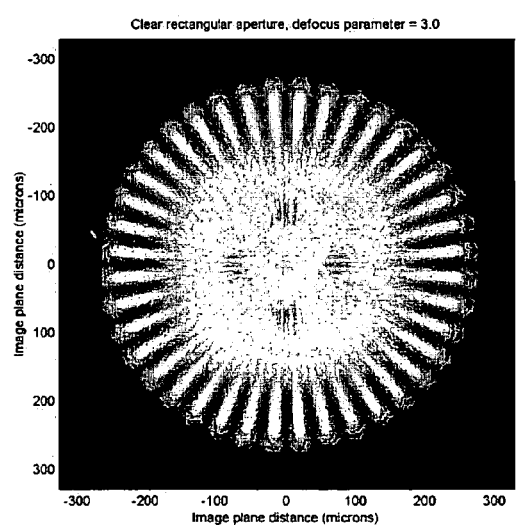
Figure 13H:
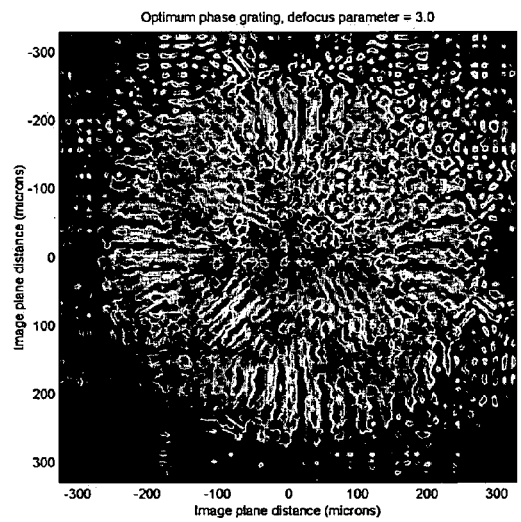

The angles in Hilbert space between the in-focus PSF and defocused PSFs of an F/4 diffraction-limited standard imaging system and a modified imaging system including the rectangular RDF phase grating are shown in FIG. 9. The parameters of the modified imaging system are shown in Table 1. It can be seen in FIG. 9 that, for all of the defocus parameter values in the range shown, the angle in Hilbert space between the in-focus PSF and defocus PSF of the modified system 12 with the rectangular RDF phase grating at its exit pupil has a greater value than the corresponding angle in Hilbert space for the standard imaging system. As a result, the shape of the PSF of a diffraction-limited modified imaging system including the rectangular RDF phase grating at its exit pupil shows greater variation with defocus than the shape of the PSF of a similar standard diffraction-limited imaging system. Furthermore, for lower defocus parameter values, the Hilbert space angle shown in FIG. 9 of the modified system is larger than the corresponding Hilbert space angle of the standard system by more than a factor of two. Therefore, a diffraction-limited modified system with the rectangular RDF phase grating at its exit pupil has less than half the depth of field of a similar diffraction-limited standard system.

Turning now to FIGS. 10A–12D, the MTF and OTF of the defocused F/4 diffraction-limited modified imaging system with the rectangular RDF are shown in FIGS. 10A–10D and in FIGS. 11A–11D, respectively, and the defocused OTF graphs of a similar diffraction-limited standard system are shown in FIGS. 12A–12D. A comparison of FIGS. 11A–11D and FIGS. 12A–12D reveals that there is a greater variation with defocus in the phase of the OTF of the modified system than in that of the standard system.

FIGS. 13A–13H show computer-simulated images of a spoke target for different defocus values. The images of FIGS. 13A, 13C, 13E and 13G show the spoke target images obtained using an F/4 incoherent diffraction-limited standard imaging system with different defocus values. The FIGS. 13B, 13D, 13F and 13H illustrate the computer-simulated images of the spoke target, for corresponding defocus values, obtained using an F/4 incoherent diffraction-limited imaging system that was modified by including the rectangular RDF phase grating. In each column, the value of the defocus parameter varies from top to bottom from 0.0 (i.e., in focus) to 3.0. It can be seen in FIGS. 13A–H that the depth of field of the imaging system that was modified with the rectangular RDF phase grating is reduced in comparison to the depth of field of the standard system. That is, the image formed with the modified imaging system changes more quickly with increased defocus parameter compared with the blurring of the image formed with the standard imaging system.

Figure 14:
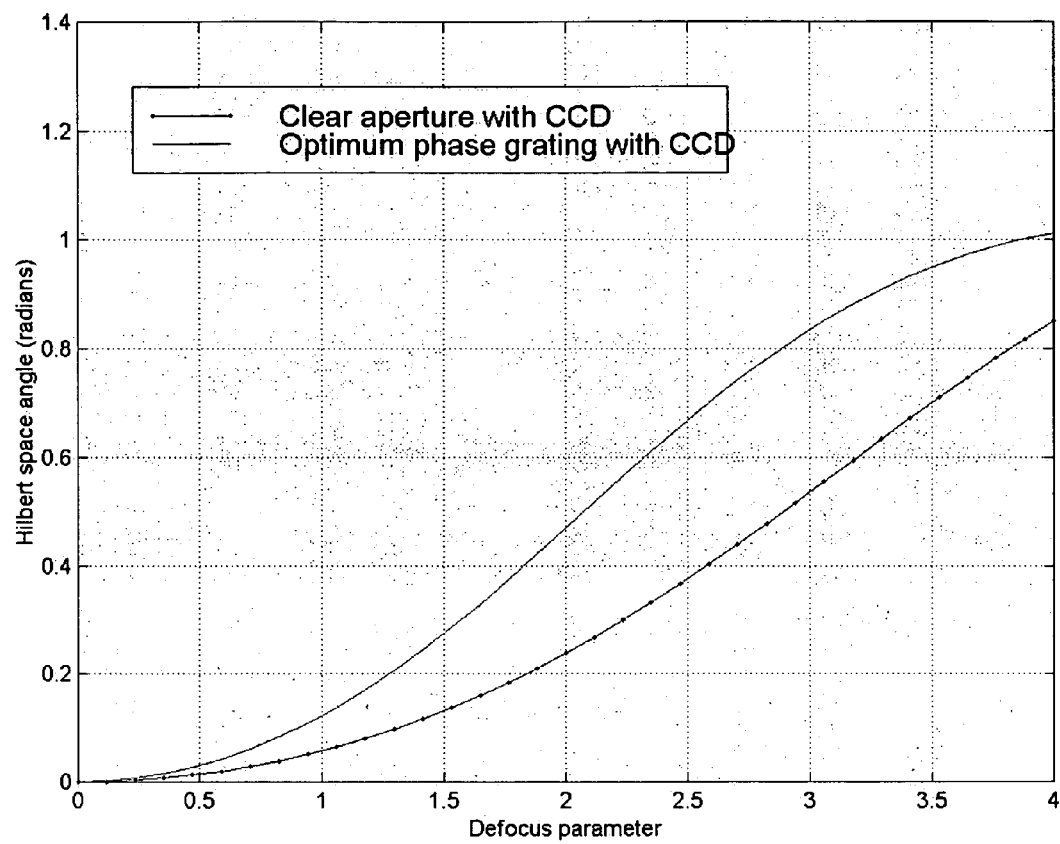
FIG. 14 is a computer-generated graph comparing the diffraction-limited Hilbert space angles for a system with and without the reduced depth of field grating.

Similar studies can be performed to examine the effect on the reduction of depth of field of using a CCD optical detector rather than an ideal optical detector. FIG. 14 shows the angles in Hilbert space between the in-focus PSF and defocused PSFs of an F/4 CCD-limited standard imaging system and a modified imaging system including the rectangular RDF phase grating. The parameters of the rectangular RDF phase grating used in this model have been optimized for use with the CCD-limited system. It can be seen in FIG. 14 that, for lower defocus parameter values, the angle in Hilbert space between the in-focus PSF and defocused PSF of a modified system with a rectangular RDF phase grating at is pupil is larger than the corresponding angle of a standard system by more than a factor of two. Therefore, a CCD-limited modulated system including a rectangular RDF phase grating at its exit pupil has less than half the depth of field of a similar CCD-limited standard imaging system.

Figure 15:
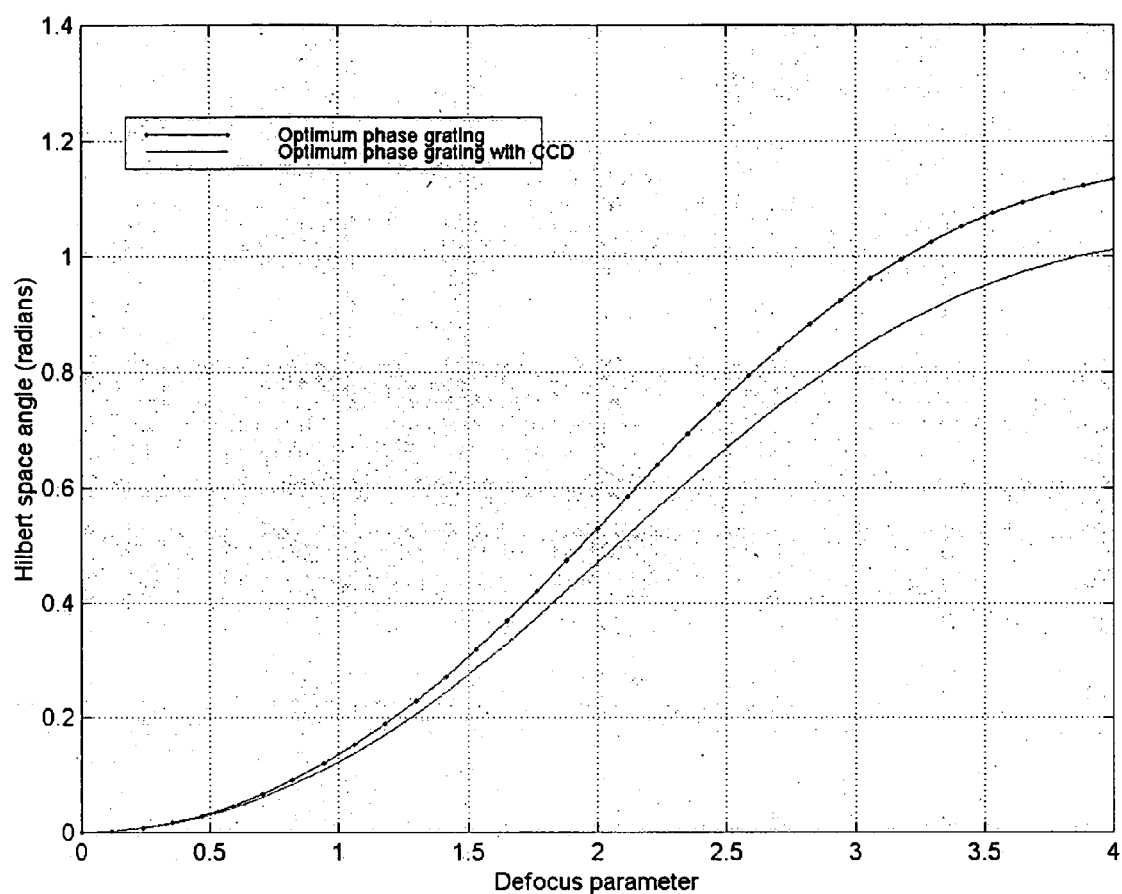
FIG. 15 is a computer-generated graph comparing the diffraction-limited and CCD-limited Hilbert space angles for an optical imaging system with the reduced depth of field phase grating.

FIG. 15 illustrates the angles in Hilbert space between the in-focus PSF and defocused PSF of an F/4 diffraction-limited imaging system modified with a rectangular RDF phase grating having the parameters shown in Table 1. Also shown in FIG. 15 are the angles in Hilbert space for a CCD-limited modified system, including a rectangular RDF phase grating with its parameters optimized for the CCD-limited system. For the defocus parameter values in the range shown in FIG. 15, the Hilbert space angles obtained from the CCD-limited system are smaller than the corresponding angles obtained from a diffraction-limited system. Therefore, as expected, the variation with defocus in the shape of the PSF of the CCD-limited system is greater than the variation with defocus of a similar system without the phase plate.

Hybrid imaging system 10 has advantages because, among other reasons, the depth of field is decreased. Therefore, images of slices of three-dimensional objects can be improved by using hybrid imaging system 10. Phase filter 16 can utilize for example the afore-described random optical mask or the rectangular RDF phase grating. Hybrid imaging system 10 is more efficient than, for example, a confocal microscope because, unlike the confocal microscope which must scan the specimen using a point source and then image each point onto a point detector, system 10 is capable of rapidly capturing each "slice" so as to quickly accumulate a three-dimensional final image with high axial resolution. Also, system 10 is faster than an imaging system with structured illumination, which requires more than one exposure for every image. Furthermore, since system 10 includes digital processing in the image acquisition procedure, rather than for manipulation of images acquired by an optical-only imaging system, system 10 provides superior final images with fewer artifacts compared to, for example, a deconvolution microscope. Hybrid imaging system 10 further facilitates imaging of thinner optical "slices" of the specimen with high lateral resolution as well as high axial resolution, resulting in a final three-dimensional image 34 with higher resolution.

Since certain changes may be made in the above methods and systems without departing from the scope hereof, it is intended that all matter contained in the above description or shown in the accompanying drawing be interpreted as illustrative and not in a limiting sense. For example, another type of high pass-filter, such as a Weiner filter, can be added to system 10 to restore the intermediate image. Nonlinear filtering can be used. It is also to be understood that the following claims are to cover all generic and specific features described herein, and all statements of the scope which, as a matter of language, might be said to fall there between.

What is claimed is:

1. An imaging system, comprising:
   an optical arrangement for forming an intermediate image of an object with a first value of axial resolution;
   a digital processor configured for processing the intermediate image to form a final image of the object; and
   at least one specially designed optical element configured to cooperate with the optical arrangement and the digital processor to define a second value of axial resolution that is greater than the first value.

2. The imaging system of claim 1 wherein the specially designed optical element is disposed between the object and the intermediate image.

3. The imaging system of claim 2, wherein the optical arrangement forms an exit pupil and wherein the specially designed optical element is disposed adjacent to the exit pupil.

4. The imaging system of claim 2, wherein the optical arrangement forms an exit pupil and an image of the exit pupil, and wherein the specially designed optical element is disposed at the image of the exit pupil.

5. The imaging system of claim 2, wherein the optical arrangement forms an aperture stop and wherein the specially designed optical element is disposed adjacent to the aperture stop.

6. The imaging system of claim 2, wherein the optical arrangement forms an aperture stop and an image of said aperture stop, and wherein the specially designed optical element is disposed at the image of the aperture stop.

7. The imaging system of claim 1, wherein the specially designed optical element includes a random phase plate.

8. The imaging system of claim 1, wherein the specially designed optical element includes a pseudo-random phase plate.

9. The imaging system of claim 1, wherein the specially designed optical element includes a phase grating.

10. The imaging system of claim 1, wherein the specially designed optical element is configured to provide a series of sinusoidal functions for modifying a phase function of electromagnetic energy forming the intermediate image.

11. The imaging system of claim 1, wherein the specially designed optical element includes at least one refractive element.

12. The imaging system of claim 1, wherein the specially designed optical element includes at least one diffractive element.

13. The imaging system of claim 1, wherein the specially designed optical element is a single optical element.

14. The imaging system of claim 13, wherein the single optical element includes at least one of refractive and diffractive qualities.

15. The imaging system of claim 1, wherein the specially designed optical element includes at least one optical surface.

16. The imaging system of claim 15, wherein said at least one optical surface includes at least one reflective surface.

17. The imaging system of claim 15, wherein said at least one optical surface includes at least one diffractive surface.

18. The imaging system of claim 1, the intermediate image having a plurality of frequency components with amplitude characteristics, wherein the specially designed optical element is configured for attenuating the amplitude characteristics of certain ones of the plurality of frequency components, and wherein the digital processor further configured for amplifying the amplitude characteristics of the certain ones of the plurality of frequency components.

19. The imaging system of claim 1, the intermediate image having a plurality of frequency components with phase characteristics, the specially designed optical element is configured for perturbing phase characteristics of certain ones of the plurality of frequency components, and wherein the digital processor further configured for correcting perturbed phase characteristics of the certain ones of the plurality of frequency components.

20. The imaging system of claim 1, wherein the optical arrangement is configured for exhibiting a first depth of field, and wherein the specially designed optical element and the digital processor are configured to cooperate to yield a second depth of field that is less than the first depth of field.

21. In an imaging system of the type having an optical arrangement configured to form an intermediate image of an object with a first depth of field, an improvement comprising:
   a digital processor configured for processing the intermediate image to form a final image of the object; and
   an optical element configured for cooperating with the optical arrangement and the digital processor
   such that the combination of said optical arrangement, digital processor and optical element yields a second depth of field that is less than the first depth of field.

22. A method for reducing depth of field of an image of an object, comprising:
   forming an intermediate image of the object by directing light from said object through at least one optical element exhibiting a first depth of field;
   perturbing a phase function of said light forming the intermediate image using a specially designed optical element; and digitally processing the intermediate image to form a final image such that the optical element and the specially designed optical element combined yield a second depth of field that is less than the first depth of field.

23. The method of claim 22, wherein said perturbing further includes positioning the specially designed optical element between the object and the image.

24. The method of claim 23, wherein said positioning further includes disposing the specially designed optical element adjacent to an exit pupil defined by the optical element.

25. The method of claim 23, wherein said positioning further includes disposing the specially designed optical element at an image of an exit pupil defined by the optical element.

26. The method of claim 23, wherein said positioning further includes disposing the specially designed optical element adjacent to an aperture stop defined by the optical element.

27. The method of claim 23, wherein said positioning further includes disposing the specially designed optical element at an image of an aperture stop defined by the optical element.

28. The method of claim 22, wherein said perturbing further includes utilizing a refractive element as the specially designed optical element.

29. The method of claim 22, wherein said perturbing further includes utilizing a diffractive element as the specially designed optical element.

30. The method of claim 22, wherein said perturbing further includes utilizing a random phase plate as the specially designed optical element.

31. The method of claim 22, wherein said perturbing further includes utilizing a pseudo-random phase plate as the specially designed optical element.

32. The method of claim 22, wherein said perturbing further includes utilizing a phase grating as the specially designed optical element.

33. The method of claim 32, wherein the phase grating exhibits an in-focus point spread function ("PSF") and an out-of-focus PSF, and wherein said utilizing includes selecting said phase grating to exhibit an angle between the in-focus PSF and the out-of-focus PSF that is maximized in Hilbert space.

34. The method of claim 22, wherein said forming the intermediate image includes producing said intermediate image with a plurality of frequency components with amplitude characteristics, wherein said perturbing includes attenuating the amplitude characteristics of certain ones of said plurality of frequency components, and wherein said digitally processing further includes amplifying the amplitude characteristics.

35. The method of claim 22, wherein said forming the intermediate image includes producing said intermediate image with a plurality of frequency components with phase characteristics, wherein said perturbing includes modifying the phase characteristics of certain ones of the plurality of frequency components, and wherein said digitally processing further includes correcting the modified phase characteristics of the certain ones of said plurality of frequency components.

36. An imaging system, comprising:
  an optical arrangement configured to form an intermediate image of an object, the optical arrangement including one or more optical elements and a specially designed optical element; and
  a digital processing arrangement configured to process the intermediate image to form (a) an in focus image of a first axial portion of the object and (b) an out of focus image of a second axial portion of the object.

37. A method for reducing depth of field of an image of an object, comprising:
  forming an intermediate image of the object by directing light from said object through at least one optical element exhibiting a first depth of field;
  perturbing a phase function of said light forming the intermediate image by using a specially designed optical element; and
  digitally processing the intermediate image, including the perturbed phase function, to form a final image such that the optical element and the specially designed optical element combined yield a second depth of field that is less than the first depth of field,
  wherein said perturbing further includes utilizing a phase grating as the specially designed optical element,
  wherein the phase grating exhibits an in-focus point spread function ("PSF") and an out-of-focus PSF, and
  wherein said utilizing includes selecting said phase grating to exhibit an angle between the in-focus PSF and the out-of-focus PSF that is maximized in Hilbert space.

* * * * *

UNITED STATES PATENT AND TRADEMARK OFFICE
CERTIFICATE OF CORRECTION

PATENT NO. : 7,031,054 B2
APPLICATION NO. : 10/682014
DATED : November 27, 2007
INVENTOR(S) : Puckette It is certified that error appears in the above-identified patent and that said Letters Patent is hereby corrected as shown below:

Column 22, lines 50-58, read:

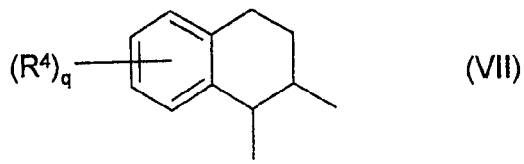

but should read:

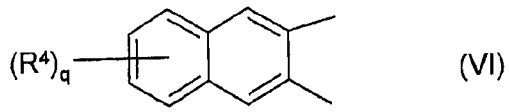

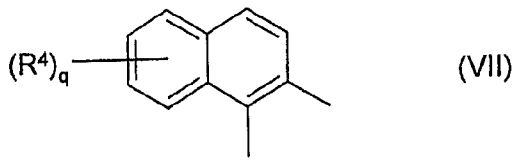

Signed and Sealed this

Sixth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 7,031,054 B2
APPLICATION NO. : 10/682014
DATED : April 18, 2006
INVENTOR(S) : Wade Thomas Cathey, Jr. et al.

It is certified that error appears in the above-identified patent and that said Letters Patent is hereby corrected as shown below:

This certificate supersedes the Certificate of Correction issued May 6, 2008. The certificate should be vacated since no Certificate of Correction was granted for this patent number.

Signed and Sealed this

Third Day of June, 2008

JON W. DUDAS
*Director of the United States Patent and Trademark Office*

UNITED STATES PATENT AND TRADEMARK OFFICE
CERTIFICATE OF CORRECTION

PATENT NO. : 7,031,054 B2
APPLICATION NO. : 10/682014
DATED : November 27, 2007
INVENTOR(S) : Cathey, Jr. et al.

It is certified that error appears in the above-identified patent and that said Letters Patent is hereby corrected as shown below:

Column 22, lines 50-58, read:

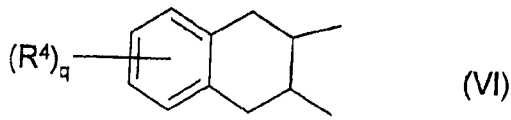     (VI)

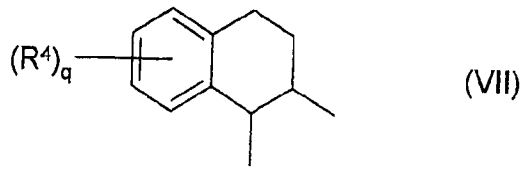     (VII)

but should read:

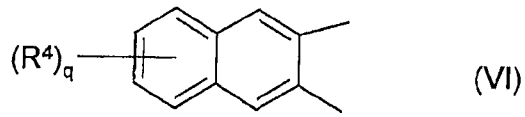     (VI)

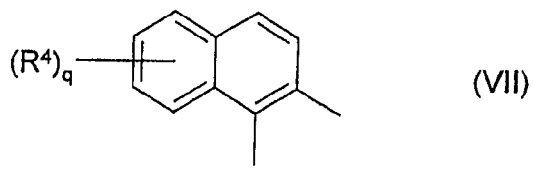     (VII)

Signed and Sealed this

Twenty-ninth Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,031,054 B2  
APPLICATION NO. : 10/682014  
DATED : April 18, 2006  
INVENTOR(S) : Wade Thomas Cathey, Jr. et al.

Page 1 of 1

It is certified that error appears in the above-identified patent and that said Letters Patent is hereby corrected as shown below:

This certificate supersedes the Certificate of Correction issued July 29, 2008. The certificate should be vacated since no Certificate of Correction was granted for this patent number.

Signed and Sealed this

Twenty-sixth Day of August, 2008

JON W. DUDAS  
*Director of the United States Patent and Trademark Office*